United States Patent
Lee et al.

(10) Patent No.: US 8,996,066 B1
(45) Date of Patent: Mar. 31, 2015

(54) METHODS AND APPARATUS FOR DIRECTING A BEAM TOWARDS A DEVICE IN THE PRESENCE OF INTERFERENCE

(75) Inventors: Jungwon Lee, Cupertino, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1256 days.

(21) Appl. No.: 12/363,047

(22) Filed: Jan. 30, 2009

Related U.S. Application Data (60) Provisional application No. 61/027,669, filed on Feb. 11, 2008.

(51) Int. Cl.
*H04W 16/28* (2009.01)

(52) U.S. Cl.
USPC .......... 455/562.1; 455/101; 455/69; 455/296; 370/334

(58) Field of Classification Search
CPC .......... H04L 25/0204; H04L 27/2647; H04W 16/28; H04W 52/42
USPC ................ 455/562.1, 296, 69, 101; 370/334
See application file for complete search history.

(56) References Cited

U.S. PATENT DOCUMENTS

| | | | |
|---|---|---|---|
| 6,377,636 B1 * | 4/2002 | Paulraj et al. | 375/346 |
| 2004/0219899 A1 * | 11/2004 | Ho et al. | 455/273 |
| 2006/0094373 A1 * | 5/2006 | Hottinen | 455/73 |
| 2006/0121946 A1 * | 6/2006 | Walton et al. | 455/561 |
| 2007/0072606 A1 * | 3/2007 | van Rooyen | 455/434 |
| 2007/0164902 A1 * | 7/2007 | Bang et al. | 342/377 |
| 2008/0075037 A1 * | 3/2008 | Guo et al. | 370/329 |
| 2009/0010359 A1 * | 1/2009 | Hwang et al. | 375/297 |
| 2009/0291699 A1 * | 11/2009 | Heath et al. | 455/501 |
| 2010/0020702 A1 * | 1/2010 | Wong et al. | 370/252 |

* cited by examiner

*Primary Examiner* — Ajit Patel
*Assistant Examiner* — Michael Irace (57) ABSTRACT

Methods and apparatus are provided for directing a beam towards a receiving device in the presence of interference. A beam transmitted by a transmission source is received by a received device. The beam shape is affected by signals transmitted by interfering sources. The receiving device computes channel estimates associated with the transmission source and the interfering sources. A feedback signal that represents the channel estimates associated with the transmission and interfering sources is transmitted to the transmission source. The transmission source changes characteristics of the beam to compensate for the interference caused by the interfering sources. The transmission source may change the characteristics of the beam by performing precoding algorithms.

24 Claims, 7 Drawing Sheets

METHODS AND APPARATUS FOR DIRECTING A BEAM TOWARDS A DEVICE IN THE PRESENCE OF INTERFERENCE

CROSS REFERENCE TO RELATED APPLICATION

This application claims the benefit of U.S. Provisional Application No. 61/027,669, filed Feb. 11, 2008, which is hereby incorporated by reference herein in its entirety.

BACKGROUND OF THE INVENTION

The present invention is directed to methods and apparatus for directing a beam towards a receiving device (e.g., beam-forming), and more particularly to performing beam-forming in the presence of interference.

Beam-forming is a signal processing technique used in systems for directional signal transmission or reception. The spatial selectivity may be achieved by using adaptive or fixed receive/transmit beam patterns. Beam-forming takes advantage of constructive/destructive wave interference to change the direction of the beam. As defined herein, a beam is the electromagnetic wave, carrying data to a receiver, which is formed by the (constructive/destructive) interference pattern of two or more waves transmitted by one or more antennas.

Typically, when shaping the beam, interferences caused by noise and/or other signals transmitted by other sources are disregarded. This is because beam-forming is traditionally performed in environments with only one transmission source (e.g., WiFi systems). In particular, in such environments, signals transmitted to different users are separated into different time slots avoiding the need to compensate for any other interferences. Additionally, receiving devices in such environments communicate with the single transmission source and no other source.

However, more complex systems (e.g., cellular, WiMAX and 3GPP Long Term Evolution (LTE) systems) may use multiple transmission sources (i.e., base stations) to communicate with a receiving device (i.e., mobile station). Thus, it becomes more difficult to shape a beam at a particular transmission source using known techniques as interferences caused by the other transmission sources alter the intended shape of the beam.

SUMMARY OF THE INVENTION

In accordance with the principles of the present invention, methods and apparatus are provided for directing a beam towards a receiving device (e.g., beam-forming) in the presence of interference, and more particularly to receiving feedback from a receiving device to compensate for interference when directing the beam.

A beam with a particular shape is transmitted by transmission source. The intended or particular shape of the beam is affected by an interference signal transmitted by an interfering source. The interfering source may be another transmission source that transmits signals that overlap with the signals transmitted by the intended transmission source and thereby alter the intended shape of the beam. For example, the transmission source may be a serving base station of a receiving device (e.g., in a cellular system) and the interfering source may be another base station that is closer or further away from the receiving device (e.g., a cell phone, mobile device, PDA or mobile phone). The receiving device receives the altered beam.

The receiving device computes and transmits a feedback signal that represents channel estimates associated with the transmission source and the interfering source to the transmission source. For example, the feedback signal may include a channel matrix that represents the channel estimate associated with the transmission source and the interfering source.

In one embodiment, the receiving device may compute two separate raw channel matrices and transmit the two raw matrices in the feedback signal separately. One of the two raw channel matrices may represent a channel estimate associated with the transmission source and the second raw channel matrix may represent a channel estimate associated with the interfering source (and optionally noise). The two raw channel matrices may be transmitted in the feedback signal sequentially or in parallel over different receiving device antennas.

In another embodiment, the receiving device may transmit in the feedback signal an equivalent channel matrix that represents channel estimates from the transmission source and the interfering source. The receiving device may compute a covariance matrix associated with the interfering source (e.g., a matrix that includes a channel estimate associated with the interfering source and optionally noise). The covariance matrix may be inverted and combined (e.g., multiplied) with the channel matrix associated with the transmission source to form the equivalent channel matrix. The equivalent channel matrix may be transmitted in the feedback signal instead of transmitting the raw channel matrices to reduce an amount of data in the feedback signal and improve efficiency.

In another embodiment, when more than one interfering source is present, the receiving device may transmit two equivalent channel matrices in the feedback signal. One of the two equivalent channel matrices may represent a matrix formed by combining a covariance matrix associated with a first interfering source channel estimate and a transmission source channel estimate. The second of the two equivalent channel matrices may be formed by combining the covariance matrix associated with the first interfering source channel estimate and a second interfering source channel estimate. The two equivalent channel matrices may be transmitted in the feedback signal sequentially or in parallel over different receiving device antennas.

Characteristics of the beam may be modified based on the feedback signal received at the transmission source to compensate for signals transmitted by the interfering source and to direct the beam towards the receiving device. For example, the transmission source may receive the feedback signal and perform precoding based on the feedback signal and transmit a beam with a different shape that compensates for interference. In particular, the shape of the beam may be more narrow to avoid an interference signal. The transmitter may perform a precoding algorithm (e.g., Tomlinson-Harashima Precoding algorithm, any other suitable linear or non-linear precoding algorithm, unitary matched-filter precoding algorithm, zero-forcing precoding algorithm, or Dirty paper coding (DPC) coding algorithm) to change the shape of the beam.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This invention generally relates to directing a beam (e.g., beam-forming) in the presence of interference. For illustrative purposes, this invention is described in the context of a cellular system with an intended transmission source (e.g., the base station that is meant to communicate with a particular device) and one interfering source (e.g., a different base station or another source generating interference signals). It should be understood, however, that this invention is applicable to any number of interfering sources in any multi-transmission source system (e.g., WiMAX, BLUETOOTH or 3GPP LTE).

Multiple Input Multiple Output (MIMO) systems may be used to improve link reliability and throughput in different environments. In cellular systems, applying beam-forming may further improve the MIMO system performance by directing the beam in the appropriate direction to a particular device (e.g., from the base station to the mobile station). Directing the beam to the receiving device may increase the received signal power and reduce any interference power that may be present. For example, while the intended receiving device receives a high power signal other devices may receive the signal with a lower power that may even appear as noise and may therefore disregard the signal.

The receiving device may compute estimates of channels associated with the intended transmission source and the interfering sources. The receiving device provides the computed estimates to the intended transmission source as a feedback signal. The transmission source uses the feedback signal information to modify characteristics of the beam and thereby the shape of the beam to compensate for any interference patterns.

As referred to herein, the term beamformer identifies the originator of the beam (e.g., the intended base station communicating with the mobile station) and the term beamformee identifies the receiving device (e.g., a mobile station) which receives the beam from the beamformer with interference patterns caused by other transmission sources (referred to as interfering sources).

Figure 1:
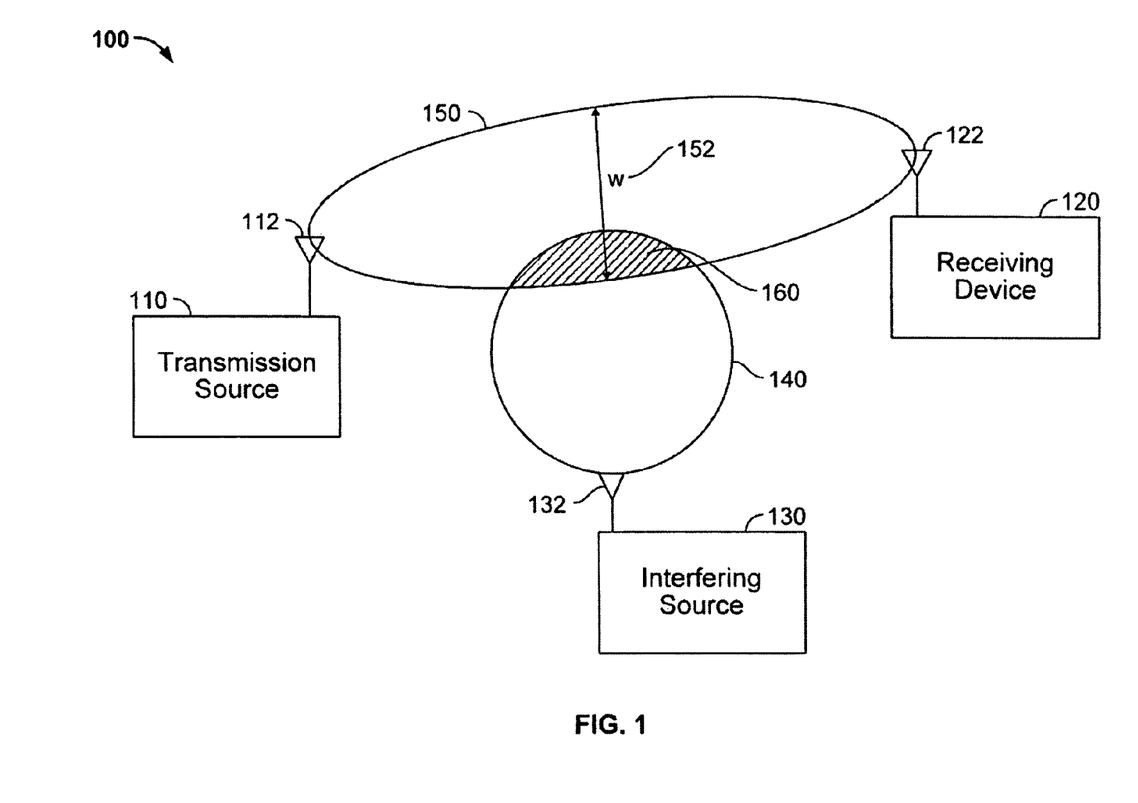
FIGS. 1 and 2 are diagrams of illustrative beam-forming systems in accordance with an embodiment of the present invention.

FIG. 1 is a diagram of an illustrative beam-forming system 100 in accordance with an embodiment of the present invention. Beam-forming system 100 may include transmission source 110, a receiving device 120 and an interfering source 130. Transmission source 110 (i.e., beamformer) may be a base station in a cellular environment that provides and receives data to/from receiving device 120.

Transmission source 110 may include any number of antennas 112 (typically two or more) to transmit a signal towards a particular device. For example, processing circuitry (not shown) within transmission source 110 may be used to modify characteristics of signals provided to antennas 112 to shape the transmission of the signals and thereby the beam in a particular way. More specifically, when transmitting, a beam-former with multiple antennas 112 may control the phase and relative amplitude of the signal at each antenna of the transmitter in order to create a pattern of constructive and destructive interference in the wavefront generated by each antenna. This pattern of constructive and destructive interference shapes the beam (i.e., the wave) formed by the combination of the waves from each antenna and points the beam in a particular direction (e.g., towards receiving device 120).

More specifically, transmission source 110 may generate a beam 150 using antennas 112. Instead of being circular, beam 150 may have an elliptical shape which is more focused at one portion than other portions. The shape of beam 150 may have a minor axis width 152. In general, it is desirable to make the beam width as narrow as possible in order to have the beam directed towards a desired receiver. On the other hand, there is a limit to how narrow a beam width can be made because the beam width is a function of the number of antennas and the antenna configuration. Usually, the larger the antenna separation, the narrower the resulting beam width. However, because the transmitter is inherently limited in physical space, the antennas can only be positioned a certain distance apart and thereby may have a maximum limit to the narrowness of the beam width the antennas can form.

Receiving device 120 may be a cellular phone, PDA, mobile device, laptop, computing device, or any other suitable device used for communicating with a transmission source 110. Receiving device 120 may have one or more antennas 122 for receiving beam 150. Depending on the location of receiving device 120, there may exist one or more interfering sources 130 that generate signals that interfere with the signals intended to be received by receiving device 120. For example, multiple base stations may generate signals that overlap a particular region in which a mobile device is situated. The mobile device may communicate with one of the base stations and the other base stations that have signals reaching the particular region may interfere with the signals of the base station with which the mobile device communicates.

In particular, interfering source 130 may have one or more antennas 132. Interfering source 130 may be another base station, transmission source, noise, mobile device or any other source that may transmit signals that overlap with the signals transmitted by transmission source 110. Interfering source 130 may generate a beam 140 that may overlap with beam 150 over some region 160. The shape of beam 150 may change as a result of the overlap in region 160 with interfering signals or beam 140 to be different than what was intended by transmission source 110. The power of beam 150 may therefore be reduced due to the interference caused by interfering signals or beam 140.

It should be understood that although one interfering source 130 is drawn, any number of interfering sources may be present. Each interfering source may generate interfering signals that may affect the shape of beam 150 intended by transmission source 110. In particular, transmission source 110 may not have the channel characteristics of signals generated by each interfering source 130 that may interfere with beam 150 and accordingly may not be able to appropriately shape and direct beam 150 towards receiving device 120.

In accordance with an embodiment of the present invention, receiving device 120 may compute the channel estimate associated with transmission source 112 and interfering source 130. Receiving device 120 may transmit a feedback signal to transmission source 110 that represents the channel estimates of transmission source and interfering source 130. As discussed in more detail below in connection with FIGS.

Figure 3:
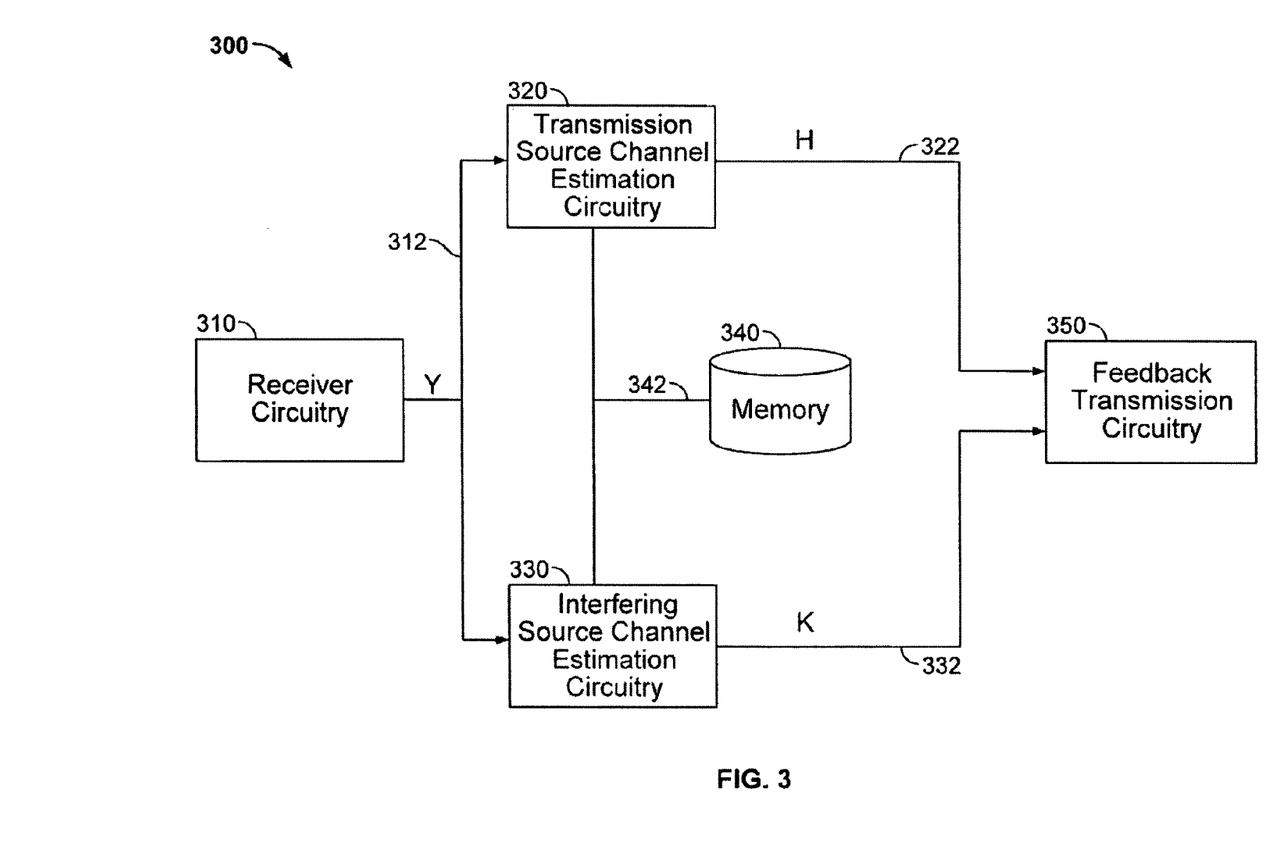
FIG. 3 is a diagram of an illustrative receiving device in accordance with an embodiment of the present invention.
Figure 4:
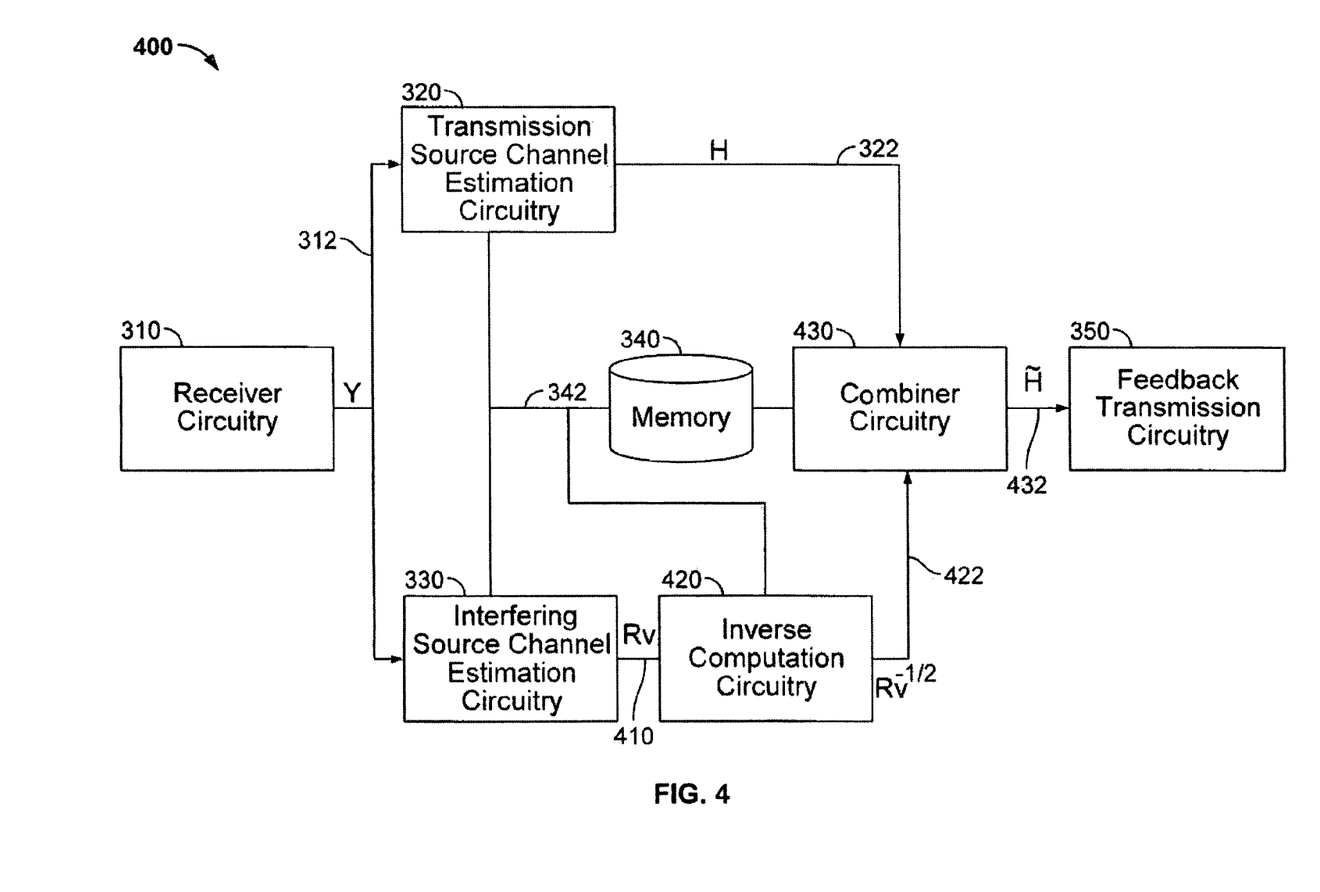
FIG. 4 is a diagram of an illustrative receiving device in accordance with another embodiment of the present invention.
Figure 5:
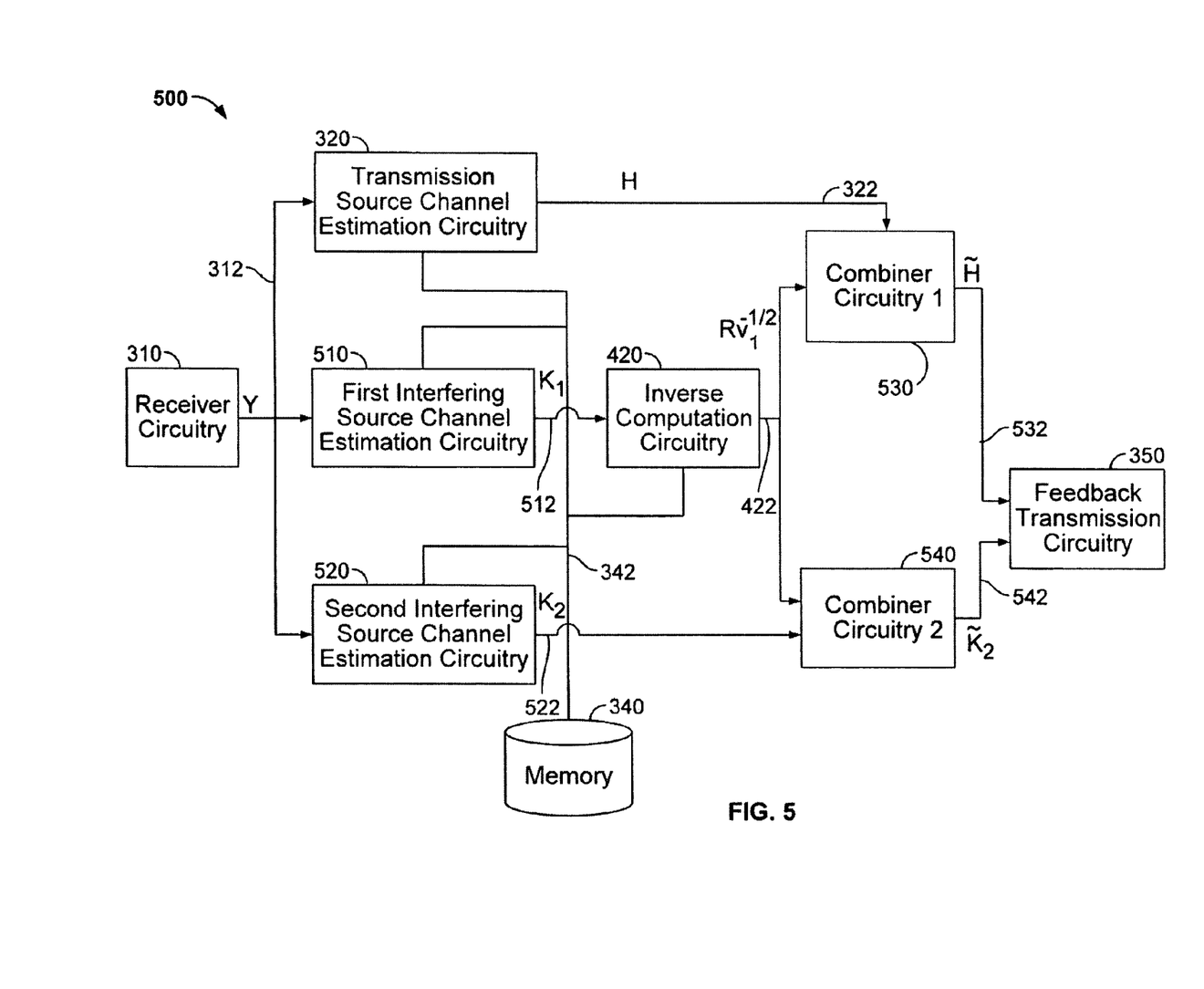
FIG. 5 is a diagram of an illustrative receiving device in accordance with another embodiment of the present invention.

3-5, receiving device 120 may transmit a feedback signal with the channel matrix associated with transmission source 110 and the channel matrix associated with interfering source 130 separately. In another implementation, receiving device 120 may compute and transmit a feedback signal with a channel matrix that represents the channel estimates associated with both transmission source 110 and interference source 130. In yet another implementation, receiving device 120 may compute and transmit a feedback signal with one channel matrix that represents the channel estimates associated with both transmission source 110 and a first interference source 130 and a second channel matrix that represents the channel estimates associated with the first interference source 130 and a second interference source 130.

Receiving device 120 may transmit any of the computed matrices in the feedback signal simultaneously using, for example, difference antennas 122. For example, receiving device 120 may transmit the feedback signal with the channel matrix of the channel estimate associated with transmission source 110 over a first antenna 122 and the channel matrix of the channel estimate associated with interfering source 130 over a second antenna 122. Alternatively, each of the matrices may be transmitted in the feedback signal using the same antenna 122 one after the other in succession.

Transmission source 110 may modify the shape of beam 150 based on the feedback signal(s) to compensate for any interference (including noise). For example, as discussed in more detail in connection with FIG. 6, transmission source 110 may use various precoding techniques to modify characteristics of beam 150 to compensate for interference.

Figure 2:
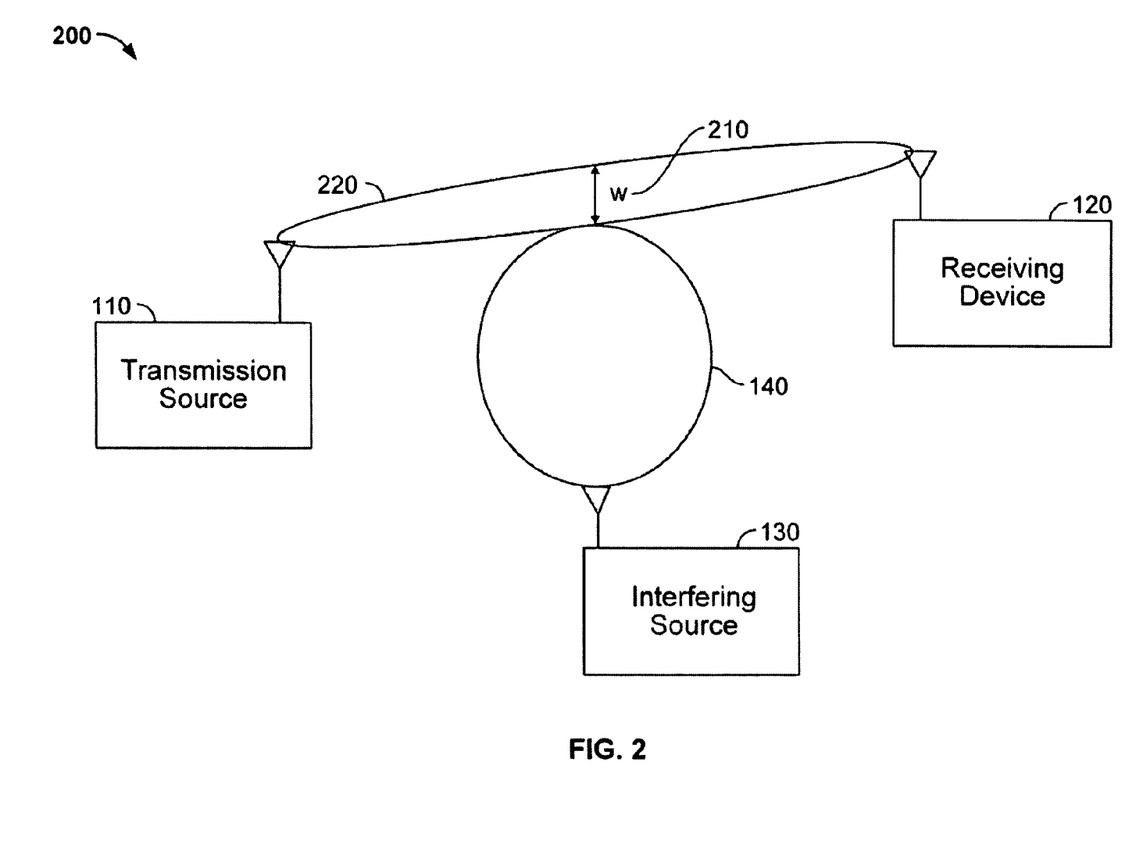

FIG. 2 is a diagram of an illustrative beam-forming system 200 in accordance with an embodiment of the present invention. As shown in system 200, transmission source 110 modifies characteristics of beam 150 (FIG. 1) to compensate for interfering sources and transmits a beam 220 directed towards receiving device 120. In particular, characteristics of beam 150 may be modified to reduce width 152. Alternatively, characteristics of beam 150 may be modified to generate the beam with higher power to compensate for interfering beam 140. The beam forming with multiple transmit antennas can be achieved by varying the gain (e.g., magnitude and phase) of each antenna. Varying the antenna gains may affect the direction, width and power of the beam.

For example, transmission source 110 may generate beam 220 with a minor axis width 210 that is smaller than minor axis width 152. Accordingly, there is no overlap or insignificant overlap between interfering beam 140 and beam 220 and thus the power of beam 220 is maintained at receiving device 120.

In some embodiments, receiving device 120 may direct the beam towards transmission source 110. This may be performed using the techniques discussed in connection with transmission source 110. For example, transmission source 110 may similarly, transmit a feedback signal to receiving device 120 that represents interference associated with signals received by transmission source 110. Receiving device 120 may shape the beam transmitted to transmission source 110 based on the feedback to increase power and reliability of the data uplink (e.g., the transmission from mobile device to base station).

In some embodiments, receiving device 120 may transmit a feedback signal to transmission source 110 with the raw channel matrix associated with transmission source 110 and the raw channel matrix associated with interfering source 130 (and optionally noise) separately. Transmitting the feedback signal with the raw channel matrices may allow transmission source 110 to perform more advanced precoding matrix calculation in shaping and directing the beam as more channel information is available in the feedback signal. Additionally, it may be desirable to transmit the raw channel matrices to transmission source 110 in the feedback signal in scenarios where the interference signals are non-Gaussian.

FIG. 3 is illustrative of this embodiment of receiving device 300 in accordance with the present invention. Receiving device 300 may include receiver circuitry 310, transmission source channel estimation circuitry 320, interfering source channel estimation circuitry 330, memory 340 and feedback transmission circuitry 350.

Receiver circuitry 310 may be coupled to one or more antennas 120 (FIG. 1) of receiving device 120. Receiver circuitry 310 may include various communication circuitry (not shown) to de-modulate and decode the information received from transmission source 110 through beam 150. For example, the received signal model of receiver 300 with N antennas 122, M intended transmission source antennas 112 and L interfering source antennas 132 in a single carrier system may be represented as:

$$y = Hx + Kw + z = Hx + v$$

where $y \in C^{N \times 1}$ and is the vector received by receiver 300, and $H \in C^{N \times M}$ is the channel matrix for the intended transmission source 110 signal, $x \in C^{M \times 1}$ is the intended transmit signal vector, $K \in C^{N \times L}$ is the channel matrix for the interfering vector, $K \in C^{N \times L}$ is the channel matrix for the interfering source 130 signals, $w \in C^{L \times 1}$ is the interfering signal vector, $z \in C^{N \times 1}$ is a noise vector and $v \in C^{N \times 1}$ is the vector that includes interference and noise where C is a complex vector/matrix. This system model may be applied to orthogonal frequency division multiplexing (OFDM) on a per-tone basis (e.g., multiple carrier system where there may be a corresponding received y signal for every carrier).

Receiver circuitry 310 may provide the received signal y 312 which represents the beam 150 to transmission source channel estimation circuitry 320 and interfering source channel estimation circuitry 330. Transmission source channel estimation circuitry 320 may compute the channel matrix H of the channel estimate associated with transmission source 110 from received signal 312. Transmission source channel estimation circuitry 320 may output the raw channel matrix H 322 associated with transmission source 110 to feedback transmission circuitry 350. Interfering source channel estimation circuitry 330 may compute the channel matrix K of the channel estimate associated with interfering source 130 (and optionally associated with a noise vector) from received signal 312. Interfering source channel estimation circuitry 330 may output the raw channel matrix K 332 associated with interfering source 130 to feedback transmission circuitry 350.

Any suitable channel estimation scheme may be used to compute the channel matrices for H and K. For example, the channel estimation may be performed with or without pilots (e.g., signal vectors that assist in computing a channel estimate). In particular, when pilots are used, for the estimation of the channel matrix H, the received signal may be represented as y=Hx+z. The intended transmitter may transmit signal vectors $[1\ 0\ 0\ \ldots\ 0]^T$, $[0\ 1\ 0\ \ldots\ 0]^T$, ..., $[0\ 0\ 0\ \ldots\ 1]^T$ sequentially or in turn. Each column of H may be estimated with a corresponding signal vector in accordance with the received signal equation. After all of the H columns are estimated, computation of the channel matrix H is complete. The estimation of K may be performed in a similar manner.

The channel matrices of the channel estimates associated with the transmission source and interfering source may be stored in memory 340. Additionally, it may be desirable for transmission source channel estimation circuitry 320 and interfering source channel estimation circuitry 330 to communicate with each other to compute the respective matrices. For example, channel matrix K associated with interfering source 130 may be computed by combining the channel matrix H 322 with expected values x (which may be retrieved from memory 340) and subtracting the value from received signal y (i.e., Kw=y−Hx). K may be derived from Kw by retrieving expected values w from memory 340 and performing a computation on Kw. Computing channel matrix K based on channel matrix H may be more efficient and may speed up the computation and transmission of the feedback signal that includes channel matrices H and K.

A communications path 342 may be provided to allow transmission source channel estimation circuitry 320 and interfering source channel estimation circuitry 330 to communicate with each other and with memory 340. Memory 340 may be any storage device including a hard disk drive, a CD ROM, EPROM, FPGA, programmable logic device, flash memory, RAM, ROM or any other suitable storage medium.

In some implementations, transmission source channel estimation circuitry 320 and interfering source channel estimation circuitry 330 may be implemented using the same component. For example, the component may compute each matrix sequentially. In particular, during a first number of clock cycles, the component may compute the channel matrix of the channel estimate associated with transmission source 110 and during a second number of clock cycles, the component may compute the channel matrix of the channel estimate associated with interfering source 130.

Feedback transmission circuitry 350 may be coupled to one or more antennas 122. Feedback transmission circuitry 350 may modulate and encode the raw channel matrix H and the raw channel matrix K and transmit the raw channel matrices to transmission source 110 as a feedback signal. In some implementations, feedback transmission circuitry 350 may share circuitry used for uplink in a mobile device. As discussed in more detail below in connection with FIG. 6, transmission source 110 may modify characteristics of beam 150 to shape the beam and direct the beam towards receiving device 120 based on the raw channel matrix H and the raw channel matrix K.

Feedback transmission circuitry 350 may first transmit the raw channel matrix H representing the channel estimate associated with transmission source 110 and may subsequently transmit the raw channel matrix K representing the channel estimate associated with interfering source 130. Alternatively, feedback transmission circuitry 350 may transmit the raw channel matrix H and the raw channel matrix K in parallel at the same time over different channels or antennas of receiving device 120. As discussed in more detail below in connection with FIG. 4, transmission source 110 may receive the raw matrices of H and K and may compute an equivalent channel matrix based on the raw matrices. Transmission source 110 may perform precoding based on the raw channel matrices or based on the equivalent channel matrix computed at the transmission source 110.

In some implementations, feedback transmission circuitry 350 may retrieve the raw channel matrix H and the raw channel matrix K from memory 340 instead of receiving the computed raw channel matrices from circuitries 320 or 330.

In some embodiments, the channel matrix H may be combined with a matrix representing the interference and optionally noise to form an equivalent channel matrix. The equivalent channel matrix may be transmitted to transmission source 110 as the feedback signal or computed by the transmission source 110 based on raw channel matrices. It may be desirable to transmit the equivalent channel matrix instead of the raw channel matrices when interference is Gaussian. Transmitting the equivalent channel matrix instead of the raw channel matrices may be more efficient as there may be less information in the equivalent channel matrix than two raw channel matrices.

FIG. 4 is illustrative of this embodiment of receiving device 400 in accordance with the present invention. Receiving device 400 includes most of the same components as receiving device 300 (FIG. 3) and is accordingly similarly labeled. In particular, receiving device 400 may include all of the components of receiving device 300 with the addition of inverse computation circuitry 420 and combiner circuitry 430.

Receiver circuitry 310 may provide the received beam y 312 to transmission source channel estimation circuitry 320 and interfering source channel estimation circuitry 330. Estimation circuitries 320 and 330 may compute the channel matrices for the transmission source and the interfering source, respectively, using any of the techniques discussed above in connection with FIG. 3.

Interfering source channel estimation circuitry 330 may store the computed interfering source channel matrix (which may include a noise estimation) in memory 340 via communications path 342. For example, interfering source channel estimation circuitry 330 may compute a covariance matrix $R_v$ 410 which is an estimate of the combined noise and interference vector v. Interfering source channel estimation circuitry 330 may compute the covariance matrix $R_v$ 410 directly or indirectly through the separate estimation of interference channel estimate K and noise component z. In some implementations, interfering source channel estimation circuitry 330 may compute sequentially or in parallel estimates of channel estimate K and/or noise component z and then compute or generate the covariance matrix $R_v$ 410 from each of the computed estimates of K and z. These estimates may be computed with or without pilots in the manner discussed above with respect to K and H or by any other suitable method. Alternatively, as discussed above, interfering source channel estimation circuitry 330 may compute the covariance matrix $R_v$ 410 by computing the difference of the received signal y and the transmission channel estimate H combined (e.g., multiplied) with the expected transmitted vector x (e.g., $R_v$=y−Hx).

The covariance matrix $R_v$ 410 may be provided either directly to inverse computation circuitry 420 or stored in memory 340 and subsequently retrieved by inverse computation circuitry 420.

Inverse computation circuitry 420 may compute the square root of the inverse of covariance matrix $R_v$ 410. In particular, inverse computation circuitry 420 may compute square root of the inverse matrix $R_v^{-1/2}$ 422 of covariance matrix $R_v$ 410. For example, inverse computation circuitry 420 may compute the square root of the inverse of covariance matrix $R_v$ 410 by using methods such as the Cholesky Factorization or any other suitable technique.

Receiver 400 may compute the equivalent channel matrix $\tilde{H}$ that represents the estimate of the transmission source channel, interference channel and noise by combining (e.g., multiplying) the square root of the inverse covariance matrix $R_v^{-1/2}$ 422 with the channel matrix H 322. The equivalent channel matrix $\tilde{H}$ is computed such that the interference and noise become white. For example, square root of the inverse covariance matrix $R_v^{-1/2}$ 422 and channel matrix H 322 may be provided to combiner circuitry 430. Combiner circuitry 430 may either receive square root of the inverse covariance matrix $R_v^{-1/2}$ 422 and channel matrix H 322 in real-time or may retrieve the matrices from memory 340. Combiner circuitry 430 may be a matrix multiplier circuit or any other mathematical circuit that multiplies two or more matrices together. In particular, combiner circuitry 430 may perform a matrix multiply operation on the square root of the inverse covariance matrix $R_v^{1/2}$ 422 and channel matrix H 322 to output equivalent channel matrix $\tilde{H}$ 432 (e.g., $\tilde{H}=R_v^{-1/2}H$).

Equivalent channel matrix $\tilde{H}$ 432 may be provided to feedback transmission circuitry 350 for transmission in the feedback signal to transmission source 110. Equivalent channel matrix $\tilde{H}$ 432 may be provided in real time by combiner circuitry 430 or may be retrieved from memory 340. Feedback transmission circuitry 350 may encode and modulate equivalent channel matrix $\tilde{H}$ 432 for transmission to transmission source 110 using one or more antennas 122 (FIG. 1).

In some embodiments, feedback transmission circuitry 350 may use an essential channel feedback scheme to decompose the matrix or matrices before transmission to reduce the amount of data (and thereby feedback) in the transmission. For example, equivalent channel matrix $\tilde{H}$ 432 may be further processed by feedback transmission circuitry 350 with QR decomposition making it necessary to only transmit the essential channel matrix R of the QR decomposition in the feedback signal to transmission source 110. In particular, equivalent channel matrix $\tilde{H}$ 432 may be rotated by a suitable amount (identified by the R matrix) to align the values along an axis to generate a upper/lower triangular matrix. The triangular matrix has zero values in predefined points which may not have to be transmitted and thus reduces the amount of data in the feedback signal. A similar algorithm may be used to transmit raw channel matrices of the transmission source and the interfering source discussed above. Transmission source 110 can use the essential channel feedback R in a similarly manner as channel matrix $\tilde{H}$ is used. The essential channel feedback scheme is described in more detail in commonly-assigned U.S. patent application Ser. No. 12/330,268, filed Dec. 8, 2008, which is hereby incorporated by reference herein in its entirety.

Transmission source 110 may perform precoding based on equivalent channel matrix $\tilde{H}$ 432 received from receiving device 120 (FIG. 1). For example, beam 220 (FIG. 2) which may be generated based on the feedback signal with equivalent channel matrix $\tilde{H}$ 432 to compensate for interference may be received in accordance with the following received signal model:

$$\tilde{y}=R_v^{-1/2}y=R_v^{-1/2}H+R_v^{-1/2}v=\tilde{H}x+n$$

where $R_v^{1/2}v$ is the identity matrix equivalent to white noise.

It should be understood that either the raw channel matrix transmission or the equivalent channel matrix transmission process may be extended to compensate for multiple interfering sources (e.g., more than one interfering source). In some embodiments, when more than one interfering source is encountered, the feedback signal may include two or more equivalent channel matrices. For example, one inverse covariance matrix associated with a first of the interfering sources may be computed. The inverse covariance matrix may be combined separately with the transmission channel matrix and with a channel matrix associated with a second of the interfering source channels. The separate matrices may be transmitted as the feedback signal using any of the techniques discussed above.

For example, in the scenario where there is one transmission source and two interfering sources and noise, the received signal model may be represented by the following equation:

$$y = Hx + \sum_{i=1}^{2} K_i w_i + z$$

where H is the channel estimate associated with the transmission source, x is the expected transmitted symbol, $K_i$ is the channel estimate associated with interfering source i, $w_i$ is the expected interference symbol of interfering source i and z is a noise component. The combined noise and partial interference vector (e.g., interference channel estimate associated with one of the two interfering sources) may be represented by vector v (i.e., $v=K_2w_2+z$). The inverse of vector v may be combined with the channel estimate H and the channel estimate $K_2$ associated with the second interfering source to provide two equivalent channel matrices (e.g., $\tilde{H}=R_v^{1/2}H$ and $\tilde{K}_1=R_v^{-1/2}K_1$). The two equivalent channel matrices may be transmitted in the feedback signal to transmission source 110 which may provide precoding based on the two equivalent channel matrices to compensate for interference. In particular, the equivalent signal model of the modified beam may be represented as:

$$\tilde{y}=R_v^{-1/2}y=\tilde{H}x+\tilde{K}_1w_1+n$$

FIG. 5 is illustrative of this embodiment of receiving device 500 in accordance with the present invention. Receiving device 500 may include receiver circuitry 310, transmission source channel estimation circuitry 320, first and second interfering source channel estimation circuitry 510 and 520, respectively, memory 340, inverse computation circuitry 420, combiner circuitries 530 and 540 and feedback transmission circuitry 350. The discussion of receiver circuitry 310, memory 340, inverse computation circuitry 420 and feedback transmission circuitry 350 is omitted for brevity as their operation and implementation may be the same or similar as that which was discussed above in connection with FIGS. 3 and 4.

Receiver circuitry 310 may provide received signal y to transmission source channel estimation circuitry 320 and first and second interfering source channel estimation circuitries 510 and 520. Transmission source channel estimation circuitry 320 may compute the channel matrix H 322 of the channel estimate associated with the transmission source. First interfering source channel estimation circuitry 510 may compute a first interference matrix $K_1$ 512 of a channel estimate associated with a first interfering source 130 plus noise. Second interfering source channel estimation circuitry 520 may compute a second interference matrix $K_2$ 522 of a channel estimate associated with a second interfering source.

The channel interference matrix estimates of the first and second interfering sources may be computed in the same manner as discussed above in connection with interfering source channel estimation circuitry 330 (FIGS. 3 and 4). The matrices of the transmission channel and the interfering sources may be stored in memory 340 via communications path 342.

Inverse computation circuitry 420 may compute a square root of a covariance matrix $R_v^{-1/2}$ 422 by computing an inverse of first interference matrix $K_1$ 512 using the same techniques as discussed above in connection with FIG. 4. Inverse computation circuitry may output the square root of the covariance matrix $R_v^{-1/2}$ 422 to combiner circuitries 530 and 540.

Two separate equivalent channel matrices may be computed by combiner circuitries 530 and 540. One of the equivalent channel matrices may be the combination of square root of the covariance matrix $R_v^{-1/2}$ 422 associated with a first interfering source and transmission channel matrix. A second of the equivalent channel matrices may be the combination of square root of the covariance matrix $R_v^{-1/2}$ 422 associated with a first interfering source and second interference channel matrix. For example, combiner circuitry 530 may perform a matrix multiply operation of square root of the covariance matrix $R_v^{-1/2}$ 422 and channel matrix H 322 to produce a first equivalent channel matrix $\tilde{H}$ 532. Combiner circuitry 540 may perform a matrix multiply operation of square root of the covariance matrix $R_v^{-1/2}$ 422 and second interference matrix $K_2$ 522 to produce a second equivalent channel matrix $\tilde{K}_2$ 542.

Although combiner circuitries 530 and 540 are drawn separately, it should be understood that their operation may be implanted by a single device or circuit. In particular, a single combiner may be used in a pipelined fashion where during a first stage, the combiner combines square root of the covariance matrix $R_v^{-1/2}$ associated with a first interfering source and transmission channel matrix to compute the first equivalent channel matrix and during a second stage, the combiner combines square root of the covariance matrix $R_v^{-1/2}$ and second interference matrix to compute the second equivalent channel matrix. Alternatively, the combiner may compute the two equivalent channel matrices in parallel.

Feedback transmission circuitry 350 may transmit a feedback signal including the two equivalent channel matrices $\tilde{H}$ 532 and $\tilde{K}_2$ 542 in the same or similar manner as discussed above in connection with FIGS. 3 and 4. For example, feedback transmission circuitry 350 may transmit the feedback signal of each matrix sequentially or in parallel over different antennas 122 (FIG. 1) of receiving device 120. Alternatively, as discussed above, transmission circuitry 350 may transmit the feedback signal by performing a decomposition of each matrix and transmitting the essential equivalent channel of each matrix. Transmission source 110 may receive the two equivalent channel matrices and modify characteristics of the beam to compensate for the two interfering sources and direct the beam towards receiving device 120.

It should be understood that the teachings in connection with receiver 500 may be extended to any number of interfering sources. For example, when three interfering sources are present, first interfering source channel estimation circuitry 510 may compute first interference matrix $K_1$ 512 based on two of the three interfering sources and second interfering source channel estimation circuitry 520 may compute the interference matrix associated with a third of the three interfering sources. The remaining operations of receiver 500 are unchanged but the two equivalent channel matrices that are computed may be larger in size since more interfering sources are accounted for. Alternatively, there may be a third interfering source channel estimation circuitry that is used to compute a third interference matrix and the covariance matrix associated with one of the three interfering sources may be similarly combined with the third interference matrix. In such a scenario, three equivalent channel matrices may be transmitted in the feedback signal which is more efficient than transmitting four raw channel matrices (e.g., H, $K_1$, $K_2$ and $K_3$).

Transmission source 110 receives the feedback signal and modifies characteristics of the beam to compensate for interference that may be present at the receiving device. For example, transmission source 110 may perform precoding operations to modify the shape of the beam by changing a phase, frequency or amplitude.

Figure 6:
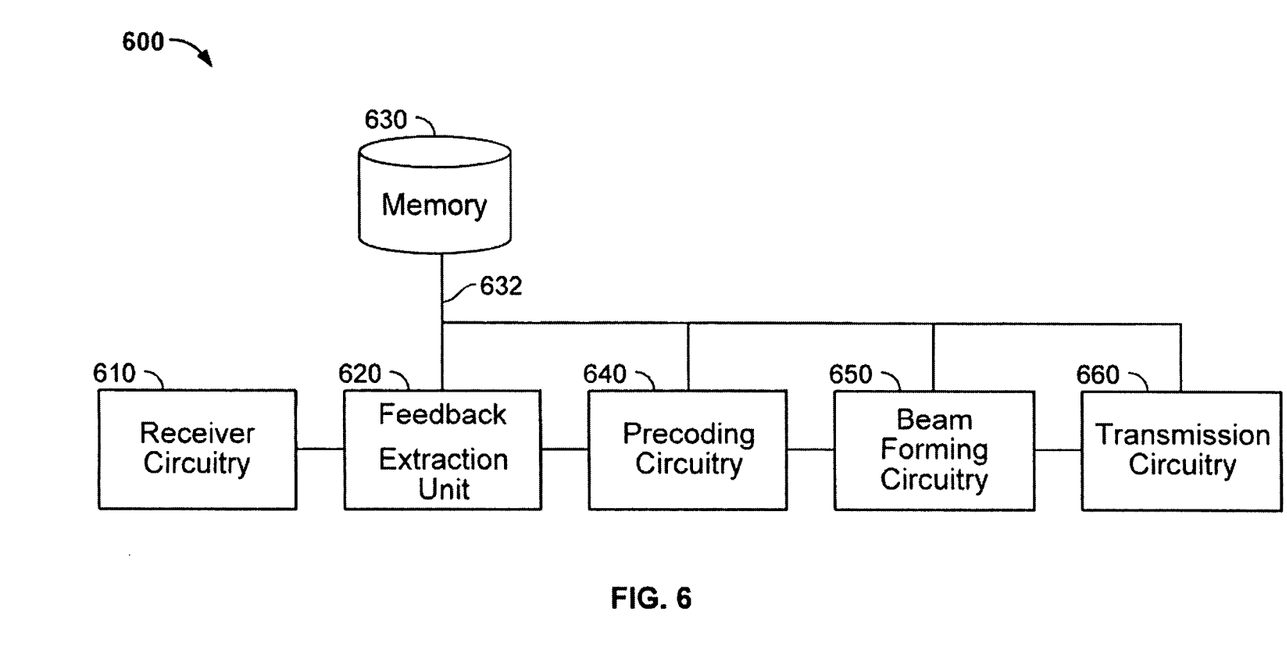
FIG. 6 is a diagram of an illustrative transmission source in accordance with an embodiment of the present invention.

FIG. 6 is a diagram of an illustrative transmission source 600 in accordance with an embodiment of the present invention. Transmission source 600 may include receiver circuitry 610, feedback extraction unit 620, a memory 630, precoding circuitry 640, beam forming circuitry 650 and transmission circuitry 660.

Receiver circuitry 610 may be coupled to one or more antennas 112 (FIG. 1) of transmission source 110. Receiver circuitry 610 may include various communication circuitry (not shown) to de-modulate and decode the information (e.g., matrix or matrices in a feedback signal) transmitted by and received from receiving device 120. In some implementations, receiver circuitry 610 may share circuitry used for uplink in a base station or transmission source.

In some embodiments, feedback extraction unit 620 may extract the raw channel matrices (H and K) from the received feedback signal. Feedback extraction unit 620 may store the data in the raw channel matrices to memory 630 via communications path 632. Feedback extraction unit 620 may also compute an equivalent channel matrix based on the raw channel matrices (H and K) in a similar manner as discussed above with reference to receiving device 400 (FIG. 4) (e.g., by computing a covariance matrix and combining the covariance matrix with the channel matrix H). The equivalent matrix may also be stored in memory 630.

In some embodiments, feedback extraction unit 620 receives an equivalent channel matrix in the feedback signal. Feedback extraction unit 620 may store the received equivalent channel matrix to memory 630. In some embodiments, feedback extraction unit 620 receives two or more equivalent channel matrices in the feedback signal and may store the matrices to memory 630. In some embodiments, feedback extraction unit 620 receives one or more essential equivalent channel matrix which may be computed by performing a QR decomposition on a particular matrix before transmitting the feedback signal. Feedback extraction unit 620 may processes the decomposed matrix by, for example, rotating the data to the original location, to extract or derive the raw channel matrix or equivalent channel matrix that was decomposed.

Precoding circuitry 640 may either receive the data provided in the feedback signal from feedback extraction unit 620 in real time or may retrieve the matrix or matrices from memory 630. Precoding circuitry 640 may perform a Singular Value Decomposition (SVD) algorithm, a Tomlinson-Harashima Precoding algorithm, or any other suitable linear or non-linear precoding algorithm (e.g., unitary matched-filter precoding algorithm, zero-forcing precoding algorithm, or Dirty paper coding (DPC) coding algorithm) to shape the beam to compensate for interference present at receiving device 120. In particular, precoding circuitry 640 may adjust the weighting of each antenna when transmitting multiple streams of the signals through one or more antennas 112 that shape the beam to compensate for the interference. For example, to perform SVD decomposition, precoding circuitry 640 may shape the beam in accordance with H=USV*, where the channel feedback is H, U and V are unitary matrices and S is a diagonal matrix. The transmit signal vector x may be generated by computing x=Vd, where d is the data signal vector. Then, Hx (i.e., the transmission channel estimate multiplied by the transmitted signal) (Hx=USV*(Vd)) becomes USd since V is a unitary matrix. The receiver may perform linear equalization with U. In that case, U*y=U*Hx+U*n=U*USV*Vd+U*n=Sd+U*n, where y is the received signal and n is noise. Because S is a diagonal matrix, there is no interference among the desired streams of d.

Beam forming circuitry 650 may use information provided by precoding circuitry 640 to modify one or more characteristics of the transmitted beam 150 (FIG. 1). For example, beam forming circuitry 650 may change a phase, frequency, power or amplitude of the transmitted beam to compensate for interference. The changed beam 220 (FIG. 2) may be more accurately pointed towards receiving device 120.

Transmission circuitry 660 may be coupled to one or more antennas 112 (FIG. 1). Transmission circuitry 660 may modulate and encode the data vector x which may be retrieved from memory 630 and transmit the data vector x in a beam with characteristics provided by beam forming circuitry 650. In some implementations, transmission circuitry 660 may share circuitry used for downlink in a base station or transmission source.

Figure 7:
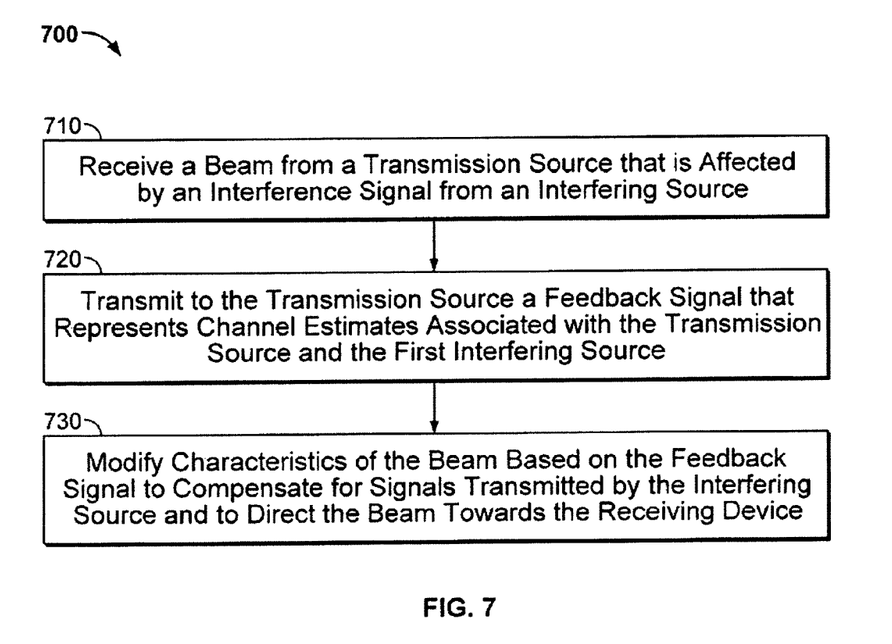
FIG. 7 illustrates a process for directing a beam towards a receiving device in the presence of interference in accordance with an embodiment of the present invention.

FIG. 7 illustrates a process 700 for directing a beam towards a receiving device in the presence of interference in accordance with an embodiment of the present invention. At step 710, a beam is received from a transmission source that is affected by an interference signal from an interfering source. For example, beam 150 is transmitted by transmission source 110. The intended shape of beam 150 is affected by an interference signal (e.g., beam 140) transmitted by interfering source 130 (FIG. 1). Transmission source 110 may be a serving base station of a receiving device 120 and interfering source 130 may be another base station that is closer or further away from receiving device 120. The interfering beam 140 overlaps with beam 150 over region 160. The resulting beam (e.g., the beam 150 affected by interfering beam 140) is received by receiving device 120.

At step 720, a feedback signal that represents channel estimates associated with the transmission source and the interfering source is transmitted to the transmission source. For example, receiving device 120 may receive the beam and generate a feedback signal that includes a channel matrix that represents the channel estimate associated with the transmission source and the interfering source (FIG. 1). In one embodiment, receiving device 300 may compute two separate channel matrices and transmit the two matrices in the feedback signal using feedback transmission circuitry 350 (FIG. 3). One of the two channel matrices may represent a channel estimate associated with the transmission source computed by transmission source channel estimation circuitry 320 and the second channel matrix may represent a channel estimate associated with the interfering source (and optionally noise) computed by interfering source channel estimation circuitry 330.

In another embodiment, receiving device 400 may transmit in the feedback signal an equivalent channel matrix that represents channel estimates from the transmission source and the interfering source (FIG. 4). In yet another embodiment, when more than one interfering source is present, receiving device 500 may transmit two equivalent channel matrices in the feedback signal (FIG. 5). One of the two equivalent channel matrices may represent a combined first interfering source channel estimate and transmission source channel estimate and a second of the two equivalent channel matrices may represent a combined first interfering source channel estimate and a second interfering source channel estimate.

At step 730, characteristics of the beam are modified based on the feedback signal to compensate for signals transmitted by the interfering source and to direct the beam towards the receiving device. For example, transmission source 110 may receive the feedback signal and perform precoding based on the feedback signal and transmit beam 220 with a different shape that compensates for interference (FIG. 2). In particular, transmitter 600 may include precoding circuitry 640 that performs an precoding algorithm (e.g., Tomlinson-Harashima Precoding algorithm, any other suitable linear or non-linear precoding algorithm, unitary matched-filter precoding algorithm, zero-forcing precoding algorithm, or Dirty paper coding (DPC) coding algorithm) to change the shape of the beam created by beam forming circuitry 650 and transmission circuitry 660 (FIG. 6).

The foregoing describes methods and apparatus for directing a beam towards a receiving device (e.g., beam-forming) in the presence of interference. The above described embodiments of the present invention are presented for the purposes of illustration and not of limitation. Furthermore, the present invention is not limited to a particular implementation. For example, one or more steps of methods described above may be performed in a different order (or concurrently) and still achieve desirable results. In addition, the invention may be implemented in hardware, such as on an application specific integrated circuit (ASIC) or on a field-programmable gate array (FPGA). The invention may also be implemented in software.

What is claimed is:

1. A method for directing a beam towards a receiving device, the method comprising:
   receiving, with the receiving device, the beam from a transmission source affected by a first interference signal from a first interfering source;
   computing, with the receiving device, separate channel estimates associated with the transmission source and the first interfering source;
   combining the channel estimate associated with the transmission source with an inverse of a covariance matrix based on the channel estimate associated with the first interfering source to generate an equivalent channel matrix;
   transmitting to the transmission source a feedback signal that includes the equivalent channel matrix; and
   modifying characteristics of the beam based on the feedback signal to compensate for signals transmitted by the interfering source and to direct the beam towards the receiving device.

2. The method of claim 1, further comprising:
   computing a channel matrix associated with the transmission source; and
   computing a channel matrix associated with the first interfering source.

3. The method of claim 1, wherein transmitting the feedback signal comprises transmitting the equivalent channel matrix.

4. The method of claim 1, further comprising:
   computing the equivalent channel matrix that represents transmission source and first interfering source channel estimates.

5. The method of claim 1, wherein computing the equivalent channel matrix comprises:
   computing a channel matrix associated with the transmission source;
   computing a square root of the inverse of the covariance matrix associated with the first interfering source and the background noise; and
   combining the square root of the inverse of the covariance matrix with the channel matrix to form the equivalent channel matrix.

6. The method of claim 4, wherein the equivalent channel matrix is computed such that interference caused by the first interference signal becomes white noise.

7. The method of claim 1, wherein modifying characteristics of the beam comprises precoding data based on the feedback signal to direct the beam transmission towards the receiving device.

8. The method of claim 7, wherein the precoding the data comprises applying a singular value decomposition algorithm or a Tomlinson-Harashima Precoding algorithm.

9. The method of claim 1, wherein:
the beam is affected by a second interference signal from a second interfering source; and
transmitting the feedback signal comprises:
- transmitting a first matrix that represents a channel estimate of the transmission source and the first interference signal; and
- transmitting a second matrix that represents a channel estimate of the second interfering source and the first interference signal.

10. The method of claim 9, further comprising:
computing a channel matrix associated with the transmission source;
computing an interference matrix associated with the second interfering source;
computing a square root of the inverse of the covariance matrix associated with the first interfering source;
combining the square root of the inverse of the covariance matrix with the channel matrix to form the first matrix; and
combining the square root of the inverse of the covariance matrix with the interference matrix to form the second matrix.

11. The method of claim 9, wherein the first and second interfering sources are the same interfering source.

12. The method of claim 1, wherein modifying characteristics of the beam changes a shape of the beam.

13. The method of claim 1, wherein the characteristics that are modified include at least one of a beam phase, a beam frequency, a beam direction and a beam amplitude.

14. The method of claim 1, wherein modifying characteristics of the beam increases signal power of the beam received by the receiving device and reduces interference power of the first interference signal.

15. The method of claim 1, wherein the first interference signal comprises noise.

16. The method of claim 1, wherein the receiving device is a cellular phone, the transmission source is a first cellular tower and the first interfering source is a second cellular tower.

17. A system for directing a beam, the system comprising:
a transmission source configured to transmit the beam;
a first interfering source configured to transmit a first interference signal;
a receiving device configured to:
- receive the beam from the transmission source, wherein the beam is affected by the first interference signal;
- compute separate channel estimates associated with the transmission source and the first interfering source;
- combine the channel estimate associated with the transmission source with an inverse of a covariance matrix based on the channel estimate associated with the first interfering source to generate an equivalent channel matrix; and
- transmit to the transmission source a feedback signal that includes the equivalent channel matrix, wherein the transmission source is further configured to modify characteristics of the beam based on the feedback signal to compensate for signals transmitted by the interfering source and to direct the beam towards the receiving device.

18. The system of claim 17, wherein the receiving device is further configured to:
compute a channel matrix associated with the transmission source; and
compute a channel matrix associated with the first interfering source.

19. The system of claim 17, wherein the receiving device is further configured to transmit the equivalent channel matrix.

20. The system of claim 17, wherein the receiving device is further configured to:
compute the equivalent channel matrix that represents transmission source and first interfering source channel estimates.

21. The system of claim 17, wherein the receiving device is further configured to:
compute a channel matrix associated with the transmission source;
compute a square root of the inverse of the covariance matrix associated with the first interfering source; and
combine the square root of the inverse of the covariance matrix with the channel matrix to form the equivalent channel matrix.

22. The system of claim 20, wherein the equivalent channel matrix is computed such that interference caused by the first interference signal becomes white noise.

23. The system of claim 17, wherein the transmission source is further configured to perform a precoding operation on data based on the feedback signal to direct the beam transmission towards the receiving device.

24. The system of claim 23, wherein the precoding operation is a singular value decomposition algorithm or a Tomlinson-Harashima Precoding algorithm.

* * * * *